(12) United States Patent
Kikuchi et al.

(10) Patent No.: US 12,533,838 B2
(45) Date of Patent: Jan. 27, 2026

(54) TEARABLE TUBE FORMED FROM FLUORORESIN

(71) Applicant: Gunze Limited, Ayabe (JP)

(72) Inventors: Masashi Kikuchi, Konan (JP); Kimiharu Uda, Konan (JP); Miki Ozeki, Konan (JP)

(73) Assignee: Gunze Limited, Ayabe (JP)

( * ) Notice: Subject to any disclaimer, the term of this patent is extended or adjusted under 35 U.S.C. 154(b) by 528 days.

(21) Appl. No.: 17/456,725

(22) Filed: Nov. 29, 2021

(65) Prior Publication Data

US 2022/0084714 A1    Mar. 17, 2022

Related U.S. Application Data

(62) Division of application No. 15/758,903, filed as application No. PCT/JP2016/074659 on Aug. 24, 2016, now abandoned.

(30) Foreign Application Priority Data

Sep. 11, 2015   (JP) .................................. 2015-179264

(51) Int. Cl.
  *B29C 48/09*   (2019.01)
  *B29C 48/00*   (2019.01)
  (Continued)

(52) U.S. Cl.
  CPC ............ *B29C 48/09* (2019.02); *B29C 48/022* (2019.02); *B29C 48/705* (2019.02);
  (Continued)

(58) Field of Classification Search
  CPC ....... B29C 48/09; B29C 48/32; B29C 48/705; B29K 2105/02; B29K 2995/0049; B29K 2995/0081; A61M 25/0668
  See application file for complete search history.

(56) References Cited

U.S. PATENT DOCUMENTS

RE27,028 E   1/1971 Ely, Jr. et al.
3,899,276 A * 8/1975 Sokolow ................. B29C 48/09
                                                    425/467
(Continued)

FOREIGN PATENT DOCUMENTS

JP   S52-040582       3/1975
JP   S60-245898 A    12/1985
(Continued)

OTHER PUBLICATIONS

Mechanical translation of Urakawa et al (JP 2004-357847 A) dated Dec. 2004. (Year: 2004).*

(Continued)

*Primary Examiner* — Jerzi H Moreno Hernandez
(74) *Attorney, Agent, or Firm* — Knobbe, Martens, Olson & Bear, LLP

(57) ABSTRACT

A method for producing the fluororesin tube, the method including a step of subjecting a thermoplastic fluororesin to melt extrusion molding at a temperature of about 260 to 450° C., wherein the thermoplastic fluororesin is selected from the group consisting of a tetrafluoroethylene-hexafluoropropylene copolymer and a tetrafluoroethylene-perfluoroalkyl vinyl ether copolymer, wherein in the melt extrusion molding, a flow path of the molten thermoplastic fluororesin is temporarily branched to form a weld line in a lengthwise direction in the fluororesin tube. In some cases, the fluororesin tube has tearing property in a lengthwise direction and the method includes subjecting the thermoplastic fluororesin, a filler and/or a contrast agent to the melt extrusion molding.

5 Claims, 5 Drawing Sheets

(51) Int. Cl.
*B29C 48/70* (2019.01)
*B29K 27/12* (2006.01)
*B29K 105/02* (2006.01)

(52) U.S. Cl.
CPC ...... *B29K 2027/12* (2013.01); *B29K 2105/02* (2013.01); *B29K 2995/0049* (2013.01); *B29K 2995/0081* (2013.01)

(56) References Cited

U.S. PATENT DOCUMENTS

| | | | |
|---|---|---|---|
| 4,874,374 A | 10/1989 | Kousai et al. | |
| 4,883,468 A | 11/1989 | Kousai et al. | |
| 4,919,605 A * | 4/1990 | Kousai | A61M 25/0668 425/467 |
| 4,938,908 A | 7/1990 | Shiraki et al. | |
| 4,946,371 A | 8/1990 | Shiraki et al. | |
| 5,154,866 A | 10/1992 | Honda et al. | |
| 5,868,707 A | 2/1999 | Williams et al. | |
| 5,873,880 A | 2/1999 | Williams et al. | |
| 5,964,730 A | 10/1999 | Williams et al. | |
| 2003/0088264 A1 * | 5/2003 | Spohn | A61M 25/0668 606/194 |
| 2008/0248226 A1 * | 10/2008 | Simon | B29D 23/001 428/34.9 |
| 2013/0018309 A1 * | 1/2013 | Ewing | A61M 25/0668 604/103.05 |
| 2014/0255633 A1 | 9/2014 | Suzuki et al. | |
| 2015/0231369 A1 | 8/2015 | Gray et al. | |
| 2015/0352319 A1 * | 12/2015 | Roof | B29C 48/09 156/86 |
| 2018/0193532 A1 * | 7/2018 | Roof | B65B 53/02 |

FOREIGN PATENT DOCUMENTS

| | | |
|---|---|---|
| JP | 64-46476 A | 2/1989 |
| JP | H05-93086 A | 4/1993 |
| JP | H5-208448 A1 | 8/1993 |
| JP | H6-74148 A | 10/1994 |
| JP | H08-216252 A | 8/1996 |
| JP | H09-328566 A | 12/1997 |
| JP | 2000-516502 A | 12/2000 |
| JP | 2004-357847 A | 12/2004 |
| JP | 2008-20037 A | 1/2006 |
| JP | 2007-179889 A1 | 7/2007 |
| JP | 2010-017670 A | 1/2010 |
| JP | 2011-057868 A | 3/2011 |
| JP | 2011-116024 A | 6/2011 |
| JP | 3182410 U | 3/2013 |
| WO | WO 2008/007680 A1 | 1/2008 |
| WO | WO 2015/127205 A1 | 8/2015 |
| WO | WO 2015/188133 A1 | 12/2015 |

OTHER PUBLICATIONS

Office Action in Counterpart Japanese Patent Application No. 2021-195959 issued Nov. 22, 2022.
International Search Report for PCT/JP2016/074659, mailed on Oct. 4, 2016 in 2 pages.
Supplemental European Search Report in corresponding European Application No. EP 16 84 4180, dated Apr. 29, 2019.
Japanese Final Office Action in corresponding Japanese Application No. 2021-195959, dated Mar. 19, 2024, in 3 pages.

* cited by examiner

TEARABLE TUBE FORMED FROM FLUORORESIN

TECHNICAL FIELD

The present invention relates to a fluororesin tube which has tearing property and is useful as a provisional covering tube etc. for products; and a method for producing the fluororesin tube.

BACKGROUND ART

Heretofore, provisional covering tubes have been widely used which cover various kinds of products such as electric wires, lead wires, catheters and guide wires, and are removed from the products after an intended purpose is achieved. Such a provisional covering tube is generally formed of a synthetic resin, a synthetic rubber or the like.

While synthetic resins and synthetic rubbers are excellent in protection property for products, a large tearing force is required in removal of the provisional covering tube from the product. Thus, there is the problem that it is difficult to tear the provisional covering tube by hand, so that much time is required for removal thereof, or a large force is applied to a product at the time of tearing the provisional covering tube, so that the product is damaged. In addition, a method has been employed in which the tube is torn after being scratched by a cutter or the like. In this method, however, a product inside the covering tube may be scratched by a cutter or the like.

As a technique for solving the above-mentioned problems, for example, Patent Document 1 discloses a provisional covering tube in which by using a special silicone rubber, the thickness is made uniform, and the transverse tensile strength is set to 80% or less of the longitudinal tensile strength. According to Patent Document 1, however, use of a special silicone rubber ensures that the transverse tensile strength is 80% or less of the longitudinal tensile strength, but the reason for this is unknown, and the technique in Patent Document 1 is a technique that can be applied only when a special silicone rubber is used.

On the other hand, a provisional covering tube is known which is excellent in heat resistance, chemical resistance, water and oil repellency and the like, and has a high mechanical strength. As a technique for improving the tearing property of a fluororesin tube, for example, Patent Document 2 discloses a technique in which a plurality of thermoplastic fluororesins of different types are melted and extruded to be molded into a tubular shape. In addition, for example, Patent Document 3 discloses a technique in which a fluororesin having a low molecular weight is used with polytetrafluoroethylene.

PRIOR ART DOCUMENTS

Patent Documents

Patent Document 1: Japanese Patent Laid-open Publication No. H05-208448
Patent Document 2: Japanese Patent Laid-open Publication No. 2008-20037
Patent Document 3: Japanese Utility Model Laid-open No. H06-74148

SUMMARY OF THE INVENTION

Problems to be Solved by the Invention

However, studies conducted by the present inventors have revealed that even in the tearable tube disclosed in each of Patent Documents 2 and 3, there are cases where a force required for tearing the tube is not stabilized, and thus tearing property is insufficient. For example, when polytetrafluoroethylene is used for a tearable tube as disclosed in Patent Document 3, a force required for tearing the tube may be increased, resulting in insufficient tearing property.

Further, a tearable tube is required to have high inner surface smoothness. That is, when a tearable tube has high inner surface smoothness, it is possible to maintain high surface smoothness of a product covered with the tearable tube. In addition, it is possible to transfer high inner surface smoothness of the tearable tube to a surface of the product by heating the tearable tube to at least a temperature at which the surface of the product is melted, so that the tearable tube is heat-shrunk to cover the product. For example, a tearable tube to be used for a catheter or the like is required to have particularly high inner surface smoothness because the catheter or the like is inserted into the body. However, studies conducted by the present inventors have revealed that when fluororesins of different types are mixed as in Patent Documents 2 and 3, there are cases where the fluororesins undergo phase separation, so that irregular shapes are formed on the inner surface of the tearable tube, leading to deterioration of inner surface smoothness.

Under the above-mentioned circumstances, a main object of the present invention is to provide a fluororesin tube excellent in tearing property and inner surface smoothness, and a method for producing the fluororesin tube.

Means for Solving the Problems

The present inventors have extensively conducted studies for solving the above-mentioned problems. As a result, the present inventors have found that when a fluororesin tube is formed from one thermoplastic fluororesin different from polytetrafluoroethylene, the fluororesin tube is excellent in lengthwise-direction tearing property and inner surface smoothness. The present invention has been completed by further conducting studies based on the above-mentioned findings.

That is, the present invention provides the inventions described below.

Item 1. A fluororesin tube having tearing property in a lengthwise direction,
the fluororesin tube being formed of one thermoplastic fluororesin different from polytetrafluoroethylene.
Item 2. The fluororesin tube according to item 1, which has heat shrinkability.
Item 3. The fluororesin tube according to item 1 or 2, which has an inner diameter heat shrinkage ratio of 20% or more when heated in a gas phase at 200° C. for 5 minutes.
Item 4. The fluororesin tube according to any one of items 1 to 3, wherein the thermoplastic fluororesin is a tetrafluoroethylene-hexafluoropropylene copolymer.
Item 5. The fluororesin tube according to any one of items 1 to 3, wherein the thermoplastic fluororesin is a tetrafluoroethylene-perfluoroalkyl vinyl ether copolymer.
Item 6. The fluororesin tube according to any one of items 1 to 5, wherein the inner diameter can be expanded by applying pressure from the inside in a heated state.
Item 7. The fluororesin tube according to any one of items 1 to 6, further including a weld line in the lengthwise direction.
Item 8. A method for producing a fluororesin tube having tearing property, the method including the step of subjecting one thermoplastic fluororesin different from polytetrafluoroethylene to melt extrusion molding, wherein in the melt extrusion molding, a flow path of the molten thermoplastic fluororesin is temporarily branched to form a weld line in a lengthwise direction in the fluororesin tube. Item 9. The method for producing a fluororesin tube according to item 8, further including the step of expanding the inner diameter by applying pressure from the inside while heating the fluororesin tube provided with the weld line.

Advantages of the Invention

According to the present invention, there can be provided a fluororesin tube excellent in lengthwise-direction tearing property and inner surface smoothness. In addition, according to the present invention, there can be provided a method for producing a fluororesin tube excellent in lengthwise-direction tearing property and inner surface smoothness. Further, according to the present invention, there can be provided various kinds of products such as electric wires, lead wires, catheters and guide wires which are covered with the fluororesin fluorine tube of the present invention.

EMBODIMENTS OF THE INVENTION

Figure 1:
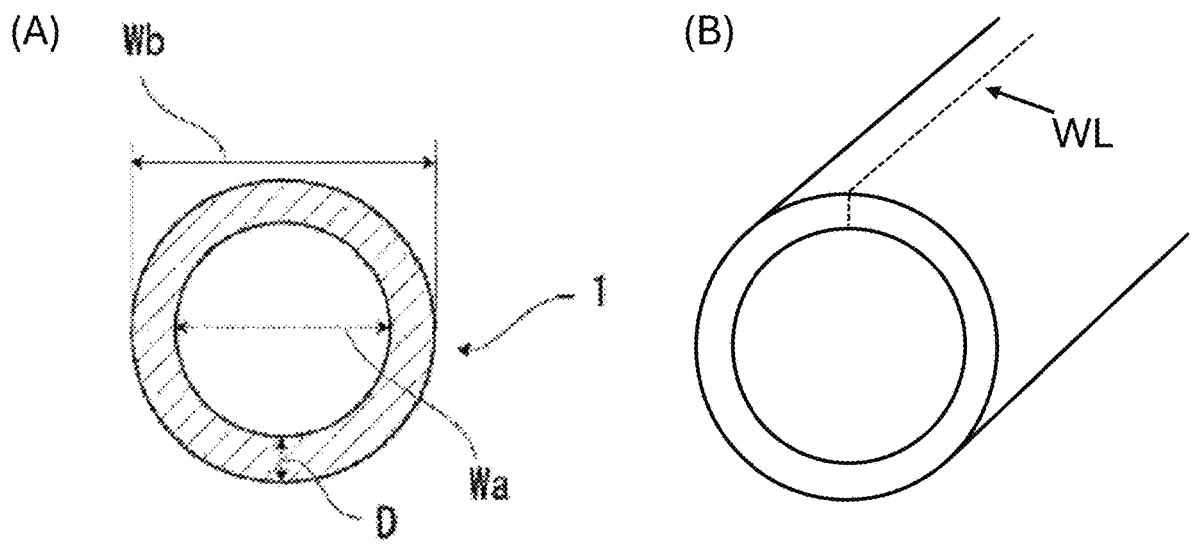
FIG. 1. (A) is a schematic sectional view of a fluororesin tube of the present invention in inner diameter and outer diameter directions. (B) is a schematic view of a fluororesin tube with an invisible weld line (WL) illustrated by a dashed line.

A fluororesin tube of the present invention has a smooth inner surface, and tearing property in a lengthwise direction, and is formed of one thermoplastic fluororesin different from polytetrafluoroethylene. Hereinafter, the fluororesin tube of the present invention will be described in detail.

The fluororesin tube of the present invention is formed of one thermoplastic fluororesin different from polytetrafluoroethylene. The thermoplastic fluororesin is not particularly limited as long as it is different from polytetrafluoroethylene, and the thermoplastic fluororesin is preferably one that can be molded into a tubular shape by melt extrusion molding at a temperature of, for example, about 260 to 450° C., preferably about 280 to 420°.

Specific examples of the preferred thermoplastic fluororesin include tetrafluoroethylene-hexafluoropropylene copolymers (FEP), tetrafluoroethylene-perfluoroalkyl vinyl ether copolymers (PFA), tetrafluoroethylene-ethylene copolymers (ETFE), polychlorotrifluoroethylene (PCTFE) and ethylene-chlorotrifluoroethylene copolymers (ECTFE). Among them, tetrafluoroethylene-hexafluoropropylene copolymers (FEP), tetrafluoroethylene-perfluoroalkyl vinyl ether copolymers (PFA) are preferable from the viewpoint of imparting particularly excellent tearing property and inner surface smoothness.

Preferably, the fluororesin tube of the present invention has heat shrinkability. The heat shrinkability of the fluororesin tube can be suitably imparted by, for example, expanding the inner diameter by applying pressure from the inside while heating the fluororesin tube. For example, when in covering (provisional covering) of a product such as an electric wire, a lead wire, a catheter or a guide wire with the fluororesin tube of the present invention, the product is inserted into a fluororesin tube having heat shrinkability, and the fluororesin tube is heat-shrunk, whereby the fluororesin tube can be suitably brought into close contact with the product to cover the product. By using, for example, a tetrafluoroethylene-hexafluoropropylene copolymer or a tetrafluoroethylene-perfluoroalkyl vinyl ether copolymer as one thermoplastic fluororesin that forms the fluororesin tube of the present invention, particularly excellent heat shrinkability can be imparted.

In the present invention, the heat shrinkage ratio of the fluororesin tube having heat shrinkability is not particularly limited, and the heat shrinkage ratio of the inner diameter in heating of the fluororesin tube in a gas phase (specifically in air) at 200° C. for 5 minutes is preferably about 20% or more, more preferably about 30 to 60%. Accordingly, the product can be suitably covered with the fluororesin tube.

The melt flow rate (MFR) of the thermoplastic fluororesin that forms the fluororesin tube of the present invention is not particularly limited, and the melt flow rate is preferably about 1.0 to 25.0 from the viewpoint of improving the tearing property and surface smoothness, and also improving the heat shrinkability of the fluororesin tube. In the present invention, the MFR of the thermoplastic fluororesin is a value measured by a method conforming to JIS K 7210: 1999.

Since the fluororesin tube of the present invention is formed of one thermoplastic fluororesin different from polytetrafluoroethylene, excellent tearing property and inner surface smoothness, and also excellent heat shrinkability can be exhibited. The details of the mechanism in which the fluororesin tube of the present invention is capable of exhibiting excellent tearing property and inner surface smoothness, and also excellent heat shrinkability can be considered as follows. That is, since the fluororesin tube of the present invention is formed of one thermoplastic fluororesin different from polytetrafluoroethylene, phase separation does not occur in the fluororesin that forms the tube, tearing property, inner surface smoothness and heat shrinkability are imparted throughout the tube with high uniformity, and resultantly the tube is excellent in these properties.

In addition, since the fluororesin tube of the present invention is formed of one thermoplastic fluororesin different from polytetrafluoroethylene, high transparency can also be exhibited. That is, the fluororesin tube of the present invention may be a transparent fluororesin tube. A product such as a catheter which is covered with the fluororesin tube of the present invention is required to be disposed in the tube with high positional accuracy when covered with the tube. Here, by using the fluororesin tube of the present invention which has high transparency, the product can be easily disposed in the tube with high positional accuracy. On the other hand, in the case of a conventional tube such as a tube obtained by melting and extruding a plurality of thermoplastic fluororesins of different types to be molded into a tubular shape or a tube obtained using polytetrafluoroethylene, the tube has low transparency, and is clouded, so that it is difficult to dispose the product in the tube with high positional accuracy. In the present invention, the transparent fluororesin tube means one that is evaluated as having high transparency in evaluation of transparency as described in examples.

In the fluororesin tube of the present invention, the "one thermoplastic fluororesin" means that the number of types of thermoplastic fluororesins should be 1 from the viewpoint of suppressing phase separation and improving tearing property and inner surface smoothness, and for example, the thermoplastic fluororesin may be a mixture of resins that are different in weight average molecular weight or polymerization form (e.g. block polymers and random polymers), or resins that are different in polymerization ratio of a plurality of monomers. That is, for example, even when the "one thermoplastic fluororesin" contains thermoplastic resins that are different in weight average molecular weight or polymerization form, or thermoplastic resins that are different in polymerization ratio of a plurality of monomers, a fluororesin tube excellent in tearing property and inner surface smoothness can be obtained because phase separation is suppressed as long as the number of types of thermoplastic fluororesins is 1. However, as described above, the "one thermoplastic fluororesin" in the present invention does not substantially include polytetrafluoroethylene because polytetrafluoroethylene is poor in tearing property.

In the present invention, the one thermoplastic fluororesin is not required to be formed of just one type of thermoplastic fluororesin as long as the effect of the present invention is exhibited, and the one thermoplastic fluororesin may be formed of substantially one type of thermoplastic fluororesin.

In addition, the fluororesin tube of the present invention may contain a filler etc. in addition to one thermoplastic fluororesin. For making it possible to photograph the fluororesin tube of the present invention by roentgenography, the fluororesin tube may contain a contrast medium such as barium sulfate may be contained in addition one thermoplastic fluororesin.

The fluororesin tube of the present invention is preferably one in which the inner diameter (and the outer diameter) can be expanded by applying pressure from the inside in a heated state. Accordingly, various kinds of products such as electric wires, lead wires, catheters and guide wires can be easily inserted into the fluororesin tube of the present invention having an expanded inner diameter. Further, since the fluororesin tube after expansion has heat shrinkability, the fluororesin tube of the present invention which has an expanded inner diameter can be heat-shrunk, and suitably brought into close contact with the product to cover the product. As a specific method for expanding the inner diameter of the fluororesin tube of the present invention, mention is made of, for example, a method in which pressure is applied from the inside of the fluororesin tube by pressurized nitrogen or the like while the fluororesin tube of the present invention is heated to about 100 to 180° C. Since the fluororesin tube of the present invention which has an expanded inner diameter has improved heat shrinkability, it is possible to more suitably cover the product by means of heat shrinkage.

The fluororesin tube of the present invention which has an expanded inner diameter is provided for facilitating insertion of various products. Therefore, in the fluororesin tube of the present invention, excellent tearing property is required mainly for the fluororesin tube before expansion of the inner diameter or the fluororesin tube which is heat-shrunk after expansion of the inner diameter. The tearing property of the fluororesin tube which is heat-shrunk after expansion of the inner diameter lies midway between the tearing property of the fluororesin tube before expansion of the inner diameter and the tearing property of the fluororesin tube after expansion of the inner diameter and before heat shrinkage although depending on a size after shrinkage.

For the tearing property of the fluororesin tube of the present invention, the tear strength measured by the following measuring method is preferably less than 8.0 N/mm, more preferably 7.5 N/mm or less, still more preferably 6.8 N/mm or less, especially preferably 5.0 N/mm or less. The lower limit of the tear strength is normally 1.0 N/mm.
(Measurement of Tear Strength)

A 40-mm cut is made at one end of a fluororesin tube (length: 100 mm), the fluororesin tube is torn at a speed of 200 mm/min by a tensile tester, and the maximum force at this time is measured, and defined as a tear strength (N). Measurement is performed three times, and the tearing property (N/mm) of the fluororesin tube is determined from the weighted average of the measurements and the wall thickness of the fluororesin tube.

The expansion ratio of the inner diameter is, for example, about 20% or more, preferably about 20 to 200%.

As shown in FIG. 1 (A), the inner diameter Wa and the outer diameter Wb (each before expansion of the inner diameter) of the fluororesin tube (1) of the present invention are not particularly limited, and can be appropriately set according to a product to be covered. The inner diameter Wa is, for example, about 0.2 to 10.0 mm, preferably about 0.2 to 5.0 mm. The outer diameter Wb is, for example, about 0.3 to 11.0 mm, preferably about 0.3 to 6.0 mm. Also shown in FIG. 1 is wall thickness (D). FIG. 1 (B) depicts an invisible weld line with a dashed line.

When the fluororesin tube of the present invention is heat-shrunk and used, the inner diameter Wa is, for example, about 0.3 to 20.0 mm, preferably about 0.3 to 10.0 mm, and the outer diameter Wb is, for example, about 0.5 to 25.0 mm, preferably about 0.5 to 12.0 mm before the fluororesin tube of the present invention covers a product (i.e. after expansion of the inner diameter and before heat shrinkage). In addition, in a state of covering a product (i.e. after the inner diameter is expanded, and the fluororesin tube is then heat-shrunk), the inner diameter Wa is, for example, about 0.2 to 10.0 mm, preferably about 0.2 to 5.0 mm, and the outer diameter Wb is, for example, about 0.3 to 11.0 mm, preferably about 0.3 to 6.0 mm.

In addition, the wall thickness (before expansion of the inner diameter) of the fluororesin tube of the present invention is not particularly limited, and can be appropriately set according to a product to be covered. The wall thickness D is, for example, about 0.03 to 1.0 mm, preferably about 0.05 to 0.5 mm. The length of the fluororesin tube of the present invention (before expansion of the inner diameter) can also be appropriately set according to a product to be covered, and is, for example, about 0.1 m or more, preferably about 0.1 to 2.5 m.

When the fluororesin tube of the present invention is heat-shrunk and used, the wall thickness D is, for example, about 0.02 to 0.7 mm, preferably about 0.02 to 0.5 mm before the fluororesin tube of the present invention covers a product (i.e. after expansion of the inner diameter and before heat shrinkage). In addition, in a state of covering a product (i.e. after the inner diameter is expanded, and the fluororesin tube is then heat-shrunk), the wall thickness D is, for example, about 0.03 to 1.0 mm, preferably about 0.05 to 0.5 mm.

Preferably, the fluororesin tube of the present invention includes a weld line in a lengthwise direction. Accordingly, particularly excellent tearing property can be exhibited. In the fluororesin tube of the present invention, the weld line may be one that is visually observable, or one that is not visually observable. In the fluororesin tube of the present invention, normally the weld line is not visually observable.

When the weld line is formed in the fluororesin tube of the present invention in a lengthwise direction, the number of the weld lines is not particularly limited, but is preferably about 1 to 10, more preferably about 2 to 8 from the viewpoint of further improving tearing property.

When the fluororesin tube of the present invention is formed of one thermoplastic fluororesin different from polytetrafluoroethylene, and has a weld line in a lengthwise direction, the fluororesin tube is not only particularly excellent in tearing property and inner surface smoothness, but also excellent in heat shrinkability. That is, since the fluororesin tube of the present invention which has a weld line in a lengthwise direction is formed of one thermoplastic fluororesin, cracks etc. are hardly generated at a portion provided with the weld line even when the inner diameter is expanded by applying pressure from the inside in a heated state, and thus the inner diameter can be suitably expanded. Further, by heating the fluororesin tube of the present invention having an expanded inner diameter, the fluororesin tube can be suitably heat-shrunk. As a specific method for forming the weld line in the fluororesin tube of the present invention, for example, the method described in "2. Method for producing fluororesin tube" below can be employed.

The fluororesin fluorine tube of the present invention can be suitably used for the purpose of covering (provisional covering) various kinds of products such as electric wires, lead wires, catheters and guide wires. The surfaces of various kinds of products such as electric wires, lead wires, catheters and guide wires are suitably protected when these products are covered with the fluororesin fluorine tube (provisional covering tube) of the present invention.

The method for producing the fluororesin tube of the present invention is not particularly limited, and the fluororesin tube can be suitably produced by, for example, the following production method.

2. Method for Producing Fluororesin Tube

A method for producing a fluororesin tube according to the present invention includes the step of subjecting one thermoplastic fluororesin different from polytetrafluoroethylene to melt extrusion molding. Further, in the method for producing a fluororesin tube according to the present invention, it is preferable that in melt extrusion molding, a flow path of the molten thermoplastic fluororesin be temporarily branched to form a weld line in a lengthwise direction in the fluororesin tube. Accordingly, a fluororesin tube excellent in not only tearing property and inner surface smoothness but also heat shrinkability can be obtained. Hereinafter, the method for producing a fluororesin tube according to the present invention will be described in detail.

In the production method of the present invention, one thermoplastic fluororesin to be subjected to melt extrusion molding is as described in the foregoing section "1. Fluororesin tube".

The temperature at which the thermoplastic fluororesin is melted (the set temperature of a die of an extrusion molding machine) in melt extrusion molding is not particularly limited as long as it is a temperature at which the thermoplastic fluororesin can be melted and formed into a tubular shape, and the temperature is, for example, about 260 to 450° C., preferably about 280 to 420° C. In addition, by mixing a filler or the like with the thermoplastic fluororesin and subjecting the mixture to melt extrusion molding, the filler or the like can be incorporated in the fluororesin tube as described in the foregoing section "2. Fluororesin Tube".

For melt extrusion molding, a known extrusion molding machine, e.g. a single screw extruder, can be used.

Figure 2:
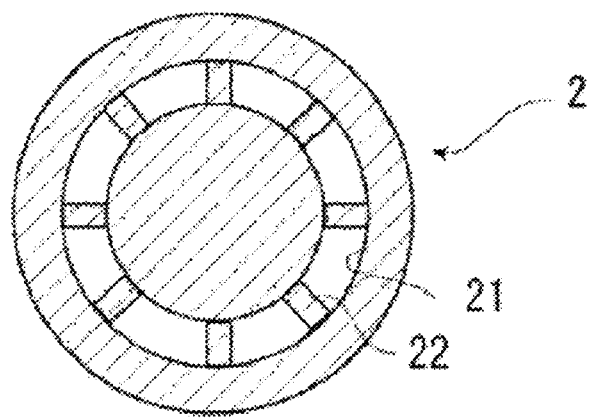
FIG. 2 is a schematic sectional view (a cross-section in a direction perpendicular to a melt extrusion direction, on which a leg portion is present) of a mold to be used for melt extrusion molding in a method for producing a fluororesin tube according to the present invention.

In the production method of the present invention, a mold 2 having a cross-section (a cross-section in a direction perpendicular to a direction along which the molten resin flows) as shown in, for example, FIG. 2 can be used in melt extrusion molding. With the shape of the mold 2, a flow path of the molten thermoplastic fluororesin can be temporarily branched to form a weld line in a lengthwise direction in the fluororesin tube. For example, when the mold 2 having a cross-section as shown in FIG. 2 is used, a plurality of leg portions 22 provided in a flow path 21 temporarily branch the flow path of the molten thermoplastic fluororesin. The branched thermoplastic resin is protruded from the mold with the weld line formed at a merged portion, and is cooled to form a fluororesin tube. Therefore, when the weld line is formed using a mold having a structure in which the flow path 21 is branched by leg portions 22 like, for example, the mold 2, weld lines, the number of which corresponds to the number of leg portions 22, are formed. In the mold 2 in FIG. 2, eight leg portions 22 are provided.

Such a weld line is capable of effectively improving the tearing property of the fluororesin tube in a lengthwise direction. In the present invention, the fluororesin tube is formed of one thermoplastic fluororesin as described above, and therefore it is possible to improve inner surface smoothness and the heat shrinkage ratio while improving the tearing property by forming the weld line.

Further, the production method of the present invention may include the step of expanding the inner diameter by applying pressure from the inside while heating the fluororesin tube provided with the weld line. By expanding the inner diameter of the fluororesin tube, a fluororesin tube having improved heat shrinkability can be produced.

EXAMPLES

Hereinafter, the present invention will be described by way of examples, but the present invention is not limited to these examples.

Example 1

A fluororesin tube was produced by melt extrusion molding with a tetrafluoroethylene-hexafluoropropylene copolymer (FEP) (FEP-130J manufactured by Du Pont-Mitsui Fluorochemicals Co., Ltd.) used as a fluororesin. In melt extrusion molding, a single screw extruder including a mold and having a cylinder diameter of 30 mm was used to perform tube molding by a sizing plate method at a screw rotation speed of 2.0 rpm and a die temperature of 330° C., thereby preparing a fluororesin tube (original tube) (before expansion) having an inner diameter of 0.5 mm, an outer diameter of 1.2 mm and a wall thickness of 0.35 mm. In the mold that was used, leg portions were provided in a flow path of a molten resin, the leg portions each had a width of 5 mm and length of 10 mm (length of the branched flow path), the number of the leg portions was 8, and the distance between a mold outlet and the leg portion on the molt outlet side was 10 mm.

Next, the resulting original tube was inserted into a cylinder having an inner diameter of 1.7 mm, and heated at 150° C. while pressurized nitrogen was added, so that the diameter was expanded, thereby obtaining a fluororesin tube having an inner diameter of 1.25 mm, an outer diameter of 1.65 mm and a wall thickness of 0.2 mm (after expansion).

Example 2

Except that as a fluororesin, a tetrafluoroethylene-perfluoroalkyl vinyl ether copolymer (PFA) (PFA 950 HPplus manufactured by Du Pont-Mitsui Fluorochemicals Co., Ltd.) was used in place of the tetrafluoroethylene-hexafluoropropylene copolymer (FEP), the same procedure as in Example 1 was carried out to prepare a fluororesin tube (original tube) (before expansion). Further, expansion was performed in the same manner as in Example 1 to obtain a fluororesin tube having an inner diameter of 1.25 mm, an outer diameter of 1.65 mm and a wall thickness of 0.2 mm (after expansion).

Comparative Example 1-1

Except that as a fluororesin, a mixture of the tetrafluoroethylene-hexafluoropropylene copolymer used in Example 1 and the tetrafluoroethylene-perfluoroalkyl vinyl ether copolymer used in Example 2 at a mass ratio of 1:1 was used, the same procedure as in Example 1 was carried out to prepare a fluororesin tube (original tune) (before expansion). Further, expansion was performed in the same manner as in Example 1, but rupture occurred during pressurization/heating, and therefore it was not able to expand the tube to the cylinder inner diameter.

Comparative Example 1-2

The same procedure as in Comparative Example 1-1 was carried out to prepare a fluororesin tube (original tube) (before expansion). Next, the resulting original tube was inserted into a cylinder having an inner diameter of 1.5 mm, and heated at 150° C. while pressurized nitrogen was added, so that the diameter was expanded, thereby obtaining a fluororesin tube having an inner diameter of 0.90 mm, an outer diameter of 1.45 mm and a wall thickness of 0.25 mm (after expansion).

Comparative Example 2-1

A mixture of 80 parts by mass of polytetrafluoroethylene (PTFE) (Teflon 6J Powder produced by Du Pont-Mitsui Fluorochemicals Co., Ltd.) and 20 parts by mass of low-molecular-weight polytetrafluoroethylene (PTFE) (TLP 10 F-1 Powder produced by Du Pont-Mitsui Fluorochemicals Co., Ltd.) was provided as a fluororesin, an extrusion aid (Isobar G manufactured by Exxon Chemical Co., Ltd.) was added in an amount of 17.5% by mass based on the total amount, and the mixture was mixed, and aged overnight at 24° C. to obtain a tube molding raw material. A tube formed by a paste extrusion molding machine using the resulting raw material was fired by continuously passing through a drying furnace and a firing furnace at 400 to 450° C., so that a fluororesin tube having an inner diameter of 0.5 mm, an outer diameter of 1.2 mm and a wall thickness of 0.35 mm (original tube) (before expansion) was prepared. Further, except that the heating temperature was set to 280° C., the same procedure as in Example 1 was carried out to perform expansion. However, rupture occurred during pressurization/heating, and therefore it was not able to expand the tube to the cylinder inner diameter.

Comparative Example 2-2

A mixture of 80 parts by mass of polytetrafluoroethylene (PTFE) (Teflon 6J Powder produced by Du Pont-Mitsui Fluorochemicals Co., Ltd.) and 20 parts by mass of low-molecular-weight polytetrafluoroethylene (PTFE) (TLP 10 F-1 Powder produced by Du Pont-Mitsui Fluorochemicals Co., Ltd.) was provided as a fluororesin, an extrusion aid (Isobar G manufactured by Exxon Chemical Co., Ltd.) was added in an amount of 17.5% by mass based on the total amount, and the mixture was mixed, and aged overnight at 24° C. to obtain a tube molding raw material. A tube formed by a paste extrusion molding machine using the resulting raw material was fired by continuously passing through a drying furnace and a firing furnace at 400 to 450° C., so that a fluororesin tube having an inner diameter of 0.5 mm, an outer diameter of 1.2 mm and a wall thickness of 0.35 mm (original tube) (before expansion) was prepared. Next, the resulting original tube was inserted into a cylinder having an inner diameter of 1.5 mm, and heated at 280° C. while pressurized nitrogen was added, so that the diameter was expanded, thereby obtaining a fluororesin tube having an inner diameter of 0.90 mm, an outer diameter of 1.45 mm and a wall thickness of 0.25 mm (after expansion).

(Evaluation of Tearing Property)

A 40-mm cut was made at one end of a fluororesin tube (length: 100 mm), the fluororesin tube was torn at a speed of 200 mm/min by a tensile tester, and the maximum force at this time was measured, and defined as a tear strength (N). Measurement was performed three times, and the tearing property (N/mm) of the tube was determined from the weighted average of the measurements and the wall thickness of the tube. The results are shown in Table 1.

(Evaluation of Inner Surface Smoothness)

Figure 3:
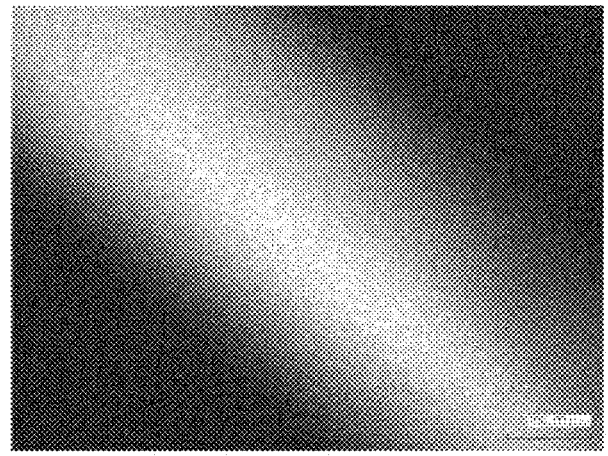
FIG. 3 is an image where the inner surface of a fluororesin tube obtained in Example 1 is observed with a laser microscope.
Figure 4:
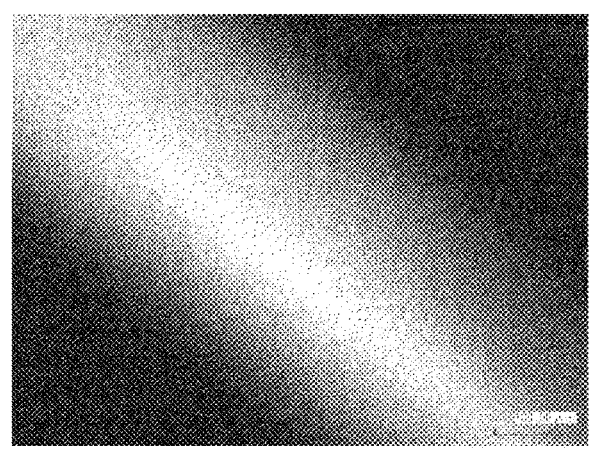
FIG. 4 is an image where the inner surface of a fluororesin tube obtained in Example 2 is observed with a laser microscope.
Figure 5:
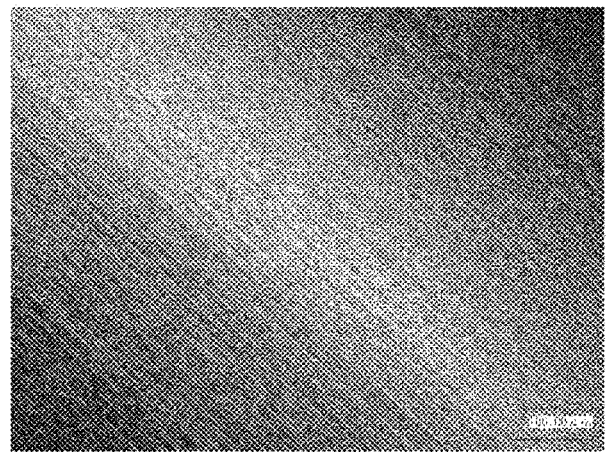
FIG. 5 is an image where the inner surface of a fluororesin tube obtained in Comparative Example 1-1 is observed with a laser microscope.
Figure 6:
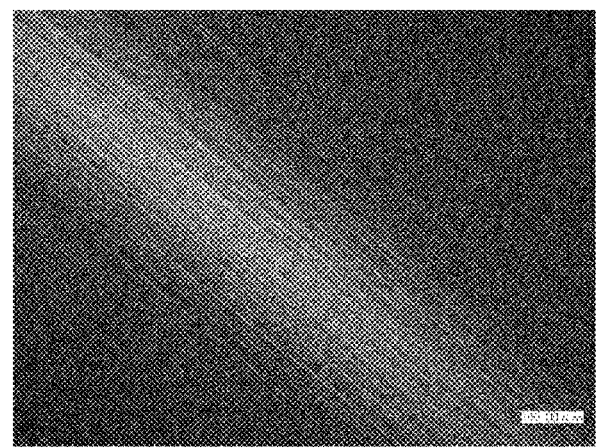
FIG. 6 is an image where the inner surface of a fluororesin tube obtained in Comparative Example 2-1 is observed with a laser microscope.
Figure 7:
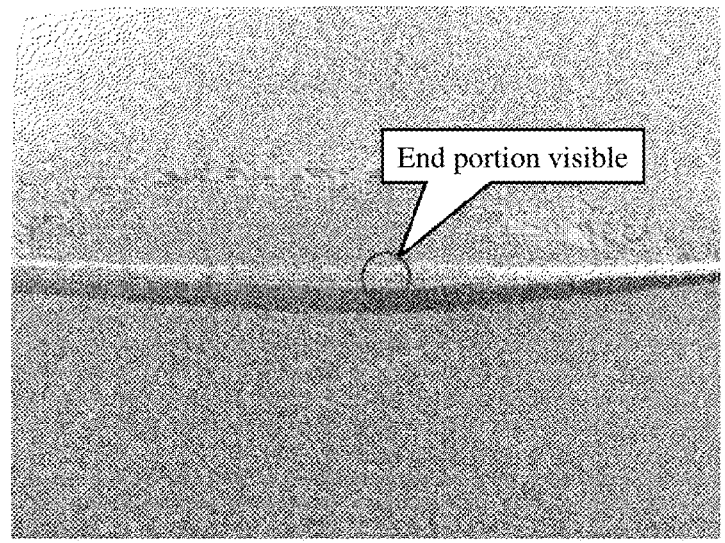
FIG. 7 is a photograph where a white nylon wire is inserted inside the fluororesin tube (before expansion) obtained in Example 1.
Figure 8:
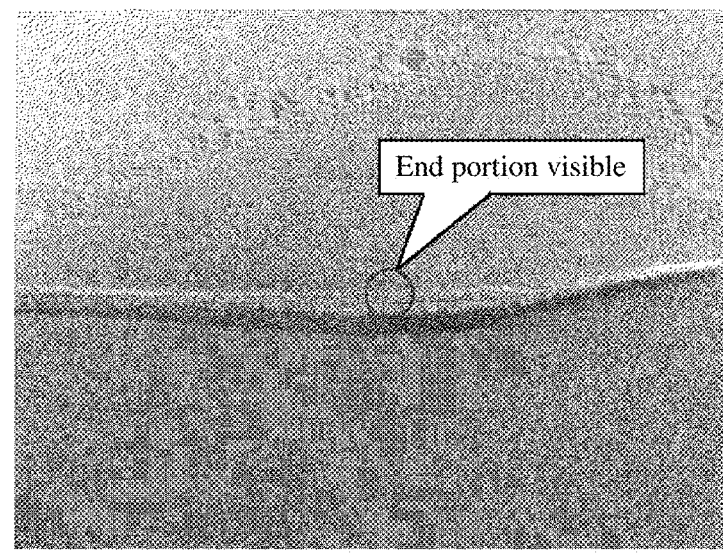
FIG. 8 is a photograph where a white nylon wire is inserted inside the fluororesin tube (before expansion) obtained in Example 2.
Figure 9:
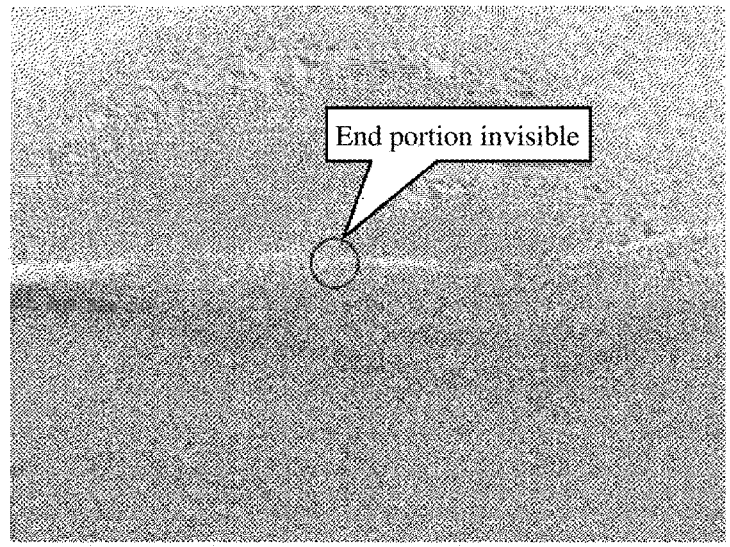
FIG. 9 is a photograph where a white nylon wire is inserted inside the fluororesin tube (before expansion) obtained in Comparative Example 1-1.
Figure 10:
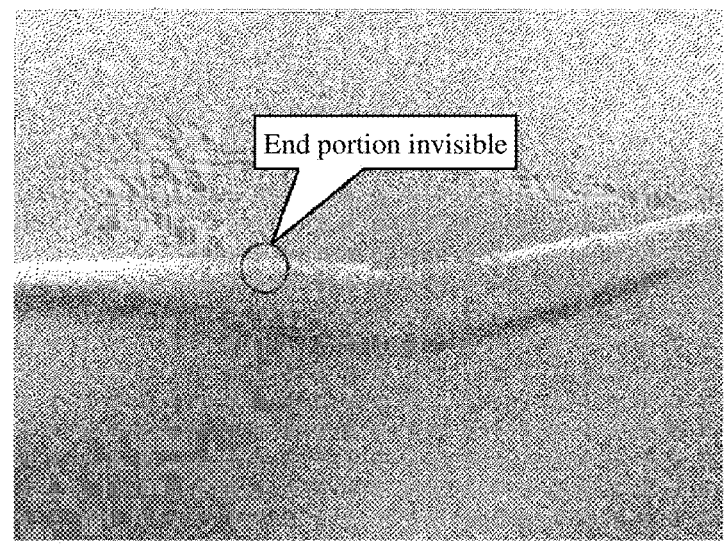
FIG. 10 is a photograph where a white nylon wire is inserted inside the fluororesin tube (before expansion) obtained in Comparative Example 2-1.

The inner surface of each fluororesin tube (before expansion) was observed with a laser microscope (Laser Microscope VK-9510 manufactured by KEYENCE CORPORATION, magnification: 400 times). A sample having a small number of irregularities on the inner surface and having high inner surface smoothness was rated ○, and a sample having a large number of irregularities on the inner surface and having low inner surface smoothness was rated x. The results are shown in Table 1. An image in Example 1 is shown in FIG. 3, an image in Example 2 is shown in FIG. 4, an image in Comparative Example 1-1 is shown in FIG. 5, and an image in Comparative Example 2-1 is shown in FIG. 6.

(Evaluation of Heat Shrinkability)

Each of the fluororesin tubes obtained in Examples 1 and 2 and Comparative Examples 1-2 and 2-2 (after expansion) was heated for 5 minutes in an oven (under air) heated at 200° C. Next, the inner diameter before heating and the inner diameter after heating were measured by a pin gauge, and the shrinkage ratio was calculated from the following equation. The results are shown in Table 1. radial-direction heat shrinkage ratio (%)=[(inner diameter of fluororesin tube (after expansion) before shrinkage)−(inner diameter of fluororesin tube (after expansion) after shrinkage)]/(inner diameter of fluororesin tube (after expansion) before shrinkage)× 100

(Evaluation of Transparency)

A white nylon wire was inserted inside each fluororesin tube (before expansion), and observed from the outside of each fluororesin tube. A sample in which the inside white nylon wire was seen through the tube was evaluated as having high transparency (◯), and a sample in which the inside white nylon wire was not seen through the tube was evaluated as having low transparency (x). FIGS. 7 to 10 show photographs where white nylon wires are inserted inside the fluororesin tubes (before expansion) obtained in Examples 1 and 2 and Comparative Examples 1-1 and 2-1, respectively. The evaluation results are shown in Table 1.

TABLE 1

|  | Tearing property (before expansion) | Tearing property (after expansion) | Tearing property (after shrinkage) | Inner surface smoothness | Transparency | Thermal shrinkage ratio |
|---|---|---|---|---|---|---|
| Example 1 | 4.3 N/mm | 6.3 N/mm | 4.4 N/mm | ◯ | ◯ | 55% |
| Example 2 | 4.5 N/mm | 6.6 N/mm | 4.7 N/mm | ◯ | ◯ | 53% |
| Comparative Example 1-1 | 1.7 N/mm | — | — | x | x | — |
| Comparative Example 1-2 | 1.7 N/mm | 2.4 N/mm | 1.9 N/mm | x | x | 39% |
| Comparative Example 2-1 | 8.0 N/mm | — | — | ◯ | x | — |
| Comparative Example 2-2 | 8.0 N/mm | — | 8.1 N/mm | ◯ | x | 38% |

As shown in Table 1, it is apparent that each of the fluororesin tubes of Examples 1 and 2, which are formed of one thermoplastic fluororesin different from polytetrafluoroethylene, requires a small force for tearing the tube. In fact, each of the fluororesin tubes obtained in Examples 1 and 2 was easily torn in a lengthwise direction by hand. In addition, each of the fluororesin tubes of Examples 1 and 2 had little irregular shapes on the inner surface, and was thus excellent in inner surface smoothness (FIGS. 3 and 4).

On the other hand, the fluororesin tube of Comparative Example 1-1 (before expansion), which was formed of two thermoplastic fluororesins, was excellent in tearing property, but was not expanded at a high ratio comparative to that in each of Examples 1 and 2. In addition, as shown in FIG. 5, the fluororesin tube of Comparative Example 1-1 had a large number of small irregular shapes on the inner surface, and was inferior in inner surface smoothness to the fluororesin tubes of Examples 1 and 2. In Comparative Example 1-2, a fluororesin tube (before expansion) obtained in the same manner as in Comparative Example 1-1 was expanded to such a degree that rupture did not occur during expansion, thereby preparing a fluororesin tube (after expansion), but this fluororesin tube was inferior in heat shrinkage ratio to the fluororesin tubes of Examples 1 and 2.

The fluororesin tube of Comparative Example 2-1 (before expansion) was poor in tearing property, and had such unstable tearing property that breakage occurred in the middle depending on a cutting condition at the end or a tearing method. In addition, the fluororesin tube (before expansion) of Comparative Example 2-1 was not able to be expanded at a high ratio comparable to that in each of Examples 1 and 2. In Comparative Example 2-2, a fluororesin tube (before expansion) obtained in the same manner as in Comparative Example 2-1 was expanded to such a degree that rupture did not occur during expansion, thereby preparing a fluororesin tube (after expansion), but this fluororesin tube was inferior in heat shrinkage ratio to the fluororesin tubes of Examples 1 and 2. The fluororesin tube (after expansion) of Comparative Example 2-2 was not torn because it had an excessively high tearing strength.

Further, each of the fluororesin tubes of examples had high transparency, whereas each of the fluororesin tubes of comparative examples had low transparency (FIGS. 7 to 10).

What is claimed is:

1. A method for producing a fluororesin tube, the method comprising:
   (a) a step of subjecting a thermoplastic fluororesin to melt extrusion molding through an extrusion molding machine at a temperature of about 260 to 450° C., wherein a temperature at which the thermoplastic fluororesin is melted and formed into a tubular shape is about 260 to 450° C., wherein the thermoplastic fluororesin is selected from the group consisting of a tetrafluoroethylene-hexafluoropropylene copolymer and a tetrafluoroethylene-perfluoroalkyl vinyl ether copolymer, wherein in the melt extrusion molding, the extrusion molding machine is configured so that a flow path of the molten thermoplastic fluororesin passing through the extrusion molding machine is temporarily branched to form a weld line in a lengthwise direction in the fluororesin tube, wherein the extrusion molding machine is configured so that the branched thermoplastic resin merges while the thermoplastic resin is contained within the extrusion molding machine and wherein the weld line of the fluororesin tube is not visible and does not have any crack associated with the weld line, and (b) a step of expanding an inner diameter of the fluororesin tube by applying a pressure from the inside of the fluororesin tube while heating the fluororesin tube with the weld line, wherein the fluororesin tube is transparent and wherein a tear strength of the fluororesin tube is less than 8.0 N/mm, and wherein a leg portion is provided in the extrusion molding machine in the flow path of the molten thermoplastic fluororesin and wherein a distance between an outlet of the extrusion molding machine and the leg portion is at least 10 mm.

2. A method for producing a fluororesin tube having tearing property in a lengthwise direction, the method comprising:
 (a) a step of subjecting each of a thermoplastic fluororesin, and a filler and/or a contrast agent, to melt extrusion molding through an extrusion molding machine at a temperature of from about 260 to 450° C., wherein the thermoplastic fluororesin is selected from the group consisting of a tetrafluoroethylene-hexafluoropropylene copolymer and a tetrafluoroethylene-perfluoroalkyl vinyl ether copolymer, wherein, in the melt extrusion molding, the extrusion molding machine is configured so that a flow path of the molten thermoplastic fluororesin passing through the extrusion molding machine is temporarily branched to form a weld line in a lengthwise direction in the fluororesin tube, wherein the extrusion molding machine is configured so that the branched thermoplastic resin merges while the thermoplastic resin is contained within the extrusion molding machine and wherein the weld line of the fluororesin tube is not visible and does not have any crack associated with the weld line, and
 (b) a step of expanding an inner diameter of the fluororesin tube by applying a pressure from the inside of the fluororesin tube while heating the fluororesin tube with the weld line,
 wherein the fluororesin tube is transparent, and wherein a tear strength of the fluororesin tube is less than 8.0 N/mm, and
 wherein a leg portion is provided in the extrusion molding machine in the flow path of the molten thermoplastic fluororesin and wherein a distance between an outlet of the extrusion molding machine and the leg portion is at least 10 mm.

3. The method according to claim 2, wherein the contrast agent is barium sulfate.

4. The method according to claim 2, wherein the fluororesin tube has heat shrinkability.

5. The method according to claim 2, wherein the fluororesin tube has an inner diameter heat shrinkage ratio of 20% or more when heated with a gas at 200° C. for 5 minutes.

* * * * *